June 11, 1963 C. B. TAYLOR 3,093,071

GRAVURE PRINTING SURFACE

Filed Aug. 1, 1961

INVENTOR
CHARLES B. TAYLOR

BY Mason, Porter, Diller & Stewart
ATTORNEYS

United States Patent Office 3,093,071

Patented June 11, 1963

3,093,071

GRAVURE PRINTING SURFACE

Charles B. Taylor, Mount Vernon, Ohio, assignor to Continental Can Company, Inc., New York, N.Y., a corporation of New York Filed Aug. 1, 1961, Ser. No. 128,574
8 Claims. (Cl. 101—401)

This invention relates in general to new and useful improvements in gravure or intaglio printing, and more particularly to a novel gravure printing surface.

This invention particularly relates to the more common techniques for reproduction of tones or light colors; i.e., by the change in surface area or depth of the etched cell of a gravure or intaglio printing plate. Generally, the printing surface will be etched to provide a rectilinear pattern of about 120 cells per inch or 14,400 cells per square inch. There are several etching techniques now in common usage. A conventional form of cell structure is to provide all cells with the same outline, but varying the depth of the cells in accordance with the light tones desired. It will be apparent that by varying the depth of the cell, the volume of ink released may be regulated. The cell depth may vary from 35 microns for solid colors to 2 microns for light colored tints or tones. The principal disadvantage of this cell configuration is that the extremely shallow cells change rapidly in volume as the printing surface wears, thus resulting in frequent and costly make-overs.

In another form of cell structure, generally referred to as the Dultgen process, both the areas of the cells and the depths of the cells are varied. This process has the same deficiencies as the conventional process referred to immediately above.

Another prominent form of cell structure is the Henderson cell, wherein all cells are of the same depth, the cells varying in cross-section to provide for regulation of the volume of ink released. A printing plate or cylinder formed in accordance with the Henderson process has a relatively long life due to the absence of "wear" deficiencies. On the other hand, the Henderson cell structure is suitable for printing only on smooth high quality surfaces.

The Henderson cell may vary in width from 130 microns for solid colors to 40 microns for light colored tints or tones. This type of cell has definite limitations in the printing of tones on relatively rough surfaced papers; for, although the paper is firmly pressed against the surface of the cylinder by a rubber roll, in many instances, the depressions or craters in the paper surface will cover single cells or even groups of cells such that the contact required to draw ink from the cells is not made. This results in unprinted areas or freckling in the finished image.

In view of the foregoing, it is the primary object of this invention to provide a new means for controlling the amount of ink per cell in a gravure printing surface that will work equally as well on paper having rough surfaces, paper having smooth surfaces and plastic film, and will not be subject to undue wear problems.

Another object of this invention is to provide a novel cell construction for gravure or intaglio printing surfaces, the cell construction being of a nature wherein the overall outline of cells for a complete range of light tones does not materially vary wherein the cells for delivering ink required for light tones are of a sufficient outline to be effective on relatively rough surfaced paper to therefore permit the proper printing on all types of conventionally used printing papers.

Another object of this invention is to provide a novel cell structure for use in gravure and intaglio printing surfaces, the cell structure being substantially of the same depth for all tones including light tones and solid colors and at the same time having a minimum range in over-all outline between the cells for light tones and the cells for solid colors wherein the individual cells are suitable for delivering ink to rough surfaced papers under normal printing conditions.

A further object of this invention is to provide a new gravure printing surface which is not unduly subject to wear and which is suitable for printing on coventional rough surfaced printing papers.

A still further object of this invention is to provide a novel cell structure for gravure printing surfaces, the cell structure being in the form of a continuous channel substantially of the same depth for all cells irrespective of the color tones produced by the cells, the width of each channel determining the volume of ink delivered by the particular cell upon contact with paper.

A still further object of this invention is to provide a novel cell structure for use in conjunction with gravure and intaglio printing surfaces, the cell structure being in the form of a generally square outline channel with the channels of different cells being substantially of the same depth and the width of the channel varying in accordance with the desired color tone, the width of the channel increasing primarily inwardly whereby all of the cells have generally the same effective over-all dimensions to permit equal printing of light tones and solid colors on rough paper surfaces.

With the above and other objects in view that will hereinafter appear, the nature of the invention will be more clearly understood by reference to the following detailed description, the appended claims and the several views illustrated in the accompanying drawing:

Figure 1:
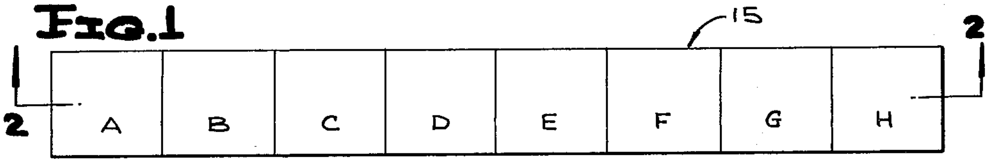
FIGURE 1 is a schematic plan view of a gravure printing surface formed in accordance with the invention, the cell structure of the printing surface ranging from light tones at the left end thereof to solid colors at the right end thereof, the printing surface having blocks of constant color tones within the range of color tones.

FIGURES 3 through 10, inclusive, are enlarged plan views showing the specific cell constructions in the tone areas of the printing plate of FIGURE 1.

Figure 11:
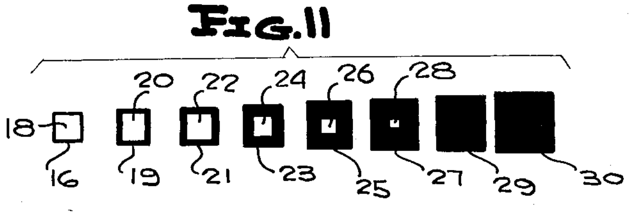

FIGURE 11 is a schematic showing of the different cell configurations in sequence to provide for ease of comparison of changes in cell configuration for variants in color tones.

Referring now to the drawings in detail, it will be seen that there is illustrated in FIGURE 1 a schematic representation of a gravure or intaglio printing plate in accordance with this invention, the printing plate being generally referred to by the numeral 15. The section of the printing plate 15 schematically illustrated in FIGURE 1 is intended for the purpose of showing variants in cell construction for variations in color tones. The surface of the printing plate 15 is divided into blocks wherein the cell construction of each of the blocks provides for a constant color tone and with the color tones of the blocks ranging from a light tone at the left end of the plate 15 to solid colors at the right end of the plate 15. The plate 15 is illustrated as having eight tone areas with these tone areas being identified by the letters A through H, inclusive. It is to be understood, however, that the number of tone areas may vary depending upon the requirements and design of the printing surface.

Figure 3:
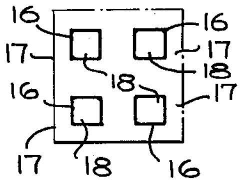

Reference is next made to FIGURE 3 which constitutes an enlargement of a portion of the cell construction in the tone area A of the printing surface of the plate 15. It is to be noted that the printing surface is divided into a plurality of square areas with each square area having an ink cell 16 therein. In accordance with the normal procedure of forming gravure and intaglio printing surfaces, there will be a linear pattern of the square areas, each square area being referred to by the numeral 17, wherein there are anywhere from 100 to 150, more or less, square areas 17 per inch to provide for 10,000 to 22,500 areas 17 per square inch of printing surface.

It is to be noted that each of the cells 16 is in the form of a rectangular channel which is very narrow in width and which is spaced inwardly from the boundaries of its particular area 17. The space defined by each of the cells 16 surrounds a center portion 18, the surface of which is coextensive with the surface of the remainder of the associated area 17 so that the printing plate 15 has a constant surface area for engagement with paper or other material on which printing is to take place, with the exception of the cell area. Each of the cells 16 is illustrated as being filled with ink for clarity of illustration.

Figure 4:
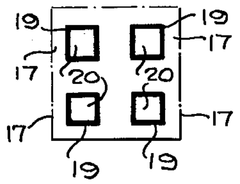

Reference is now made to FIGURE 4 wherein there are illustrated cell constructions corresponding to the tone area B of the printing plate 15. It is to be noted that the cells in FIGURE 4, which cells are referred to by the numeral 19, are of the same general outline as the cells 16, but the channels are of an increased width. The increase in width of the channels defining the cells 19 is both inwardly and outwardly, with a major portion of the increase being inwardly. As a result, each cell 19 surrounds a central portion 20 of the printing surface of the printing plate 15 with the size of the central portion 20 being less than that of the central portion 18 of the cell 16.

Figure 5:
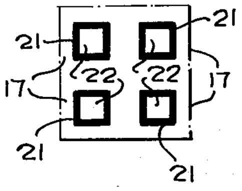

FIGURE 5 shows cells 21 which correspond to the cells of the tone area C of the printing plate 15 in FIGURE 1. Like the cells 16 or 19, the cells 21 are in the form of continuous channels formed in the surface of the printing plate 15. However, the widths of the channels of the cells 21 have increased over the widths of the channels of the cells 19 with the increase in width being both inwardly and outwardly, and the inward increase in width being greater than the outward increase in width. Each cell 21 defines a central portion 22 of the surface of the printing plate 15, which central portion 22 is decreased in area over the central portion 20.

Figure 6:
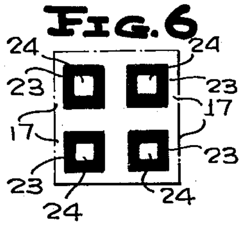

FIGURE 6 shows a plurality of cells 23 which correspond to the cells in the tone area D of the printing plate 15. Once again, the width of the channel defining each cell 23 has increased both inwardly and outwardly over the width of the channel of the preceding cell, with the increase in width being primarily inwardly. The channel of the cell 23 defines a central portion 24 of the printing surface which again has decreased in area as compared to the central portions 18, 20 and 22.

Figure 7:
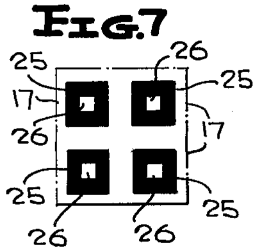

Reference is now made to FIGURE 7 wherein there are illustrated cells 25 which correspond to the cells of the tone area E of the printing plate 15. Like the above-described other cells, the cell 25 is in the form of a peripheral channel. The width of the channel of the cell 25 is increased over the width of the channel of the cell 23 and the cell 25 surrounds a central portion 26 of the surface of the plate 15 which is smaller than the central portion 24 associated with the cell 23. The increase in width of the channel of the cell 25 is both inwardly and outwardly with a major portion of the increase being inwardly.

Figure 8:
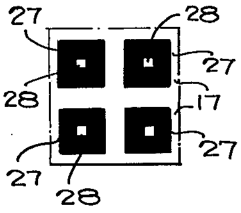

In FIGURE 8, there are illustrated cells 27 which have inwardly increased in width to the extent that only a very small central portion 28 of the surface of the printing plate 15 remains. The cells 27 correspond to the cells of the tone area F of the printing plate 15 and are in the form of continuous channels which have increased in width over the width of the channels of the cells 25. Once again, this increase in width has been both inwardly and outwardly with a major portion of the increase being inwardly.

Figure 9:
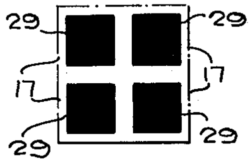

In FIGURE 9 there are illustrated cavities 29 which correspond to the cells of the tone area G of the printing plate 15. It is to be noted that the cavity 29 is not of a channel configuration as are the previously described cells the size of the cavity 29 having increased inwardly to the extent that there no longer remains a central portion of the surface of the printing plate within the confines of the cavity. The cavity 29 is for solid colors or full tone depth.

Figure 10:
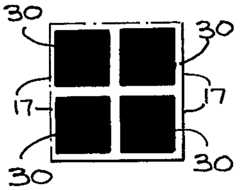

In FIGURE 10, there are illustrated cavities 30 which correspond to the cavities of the solid color area H of the printing plate 15. Like the cavity 29, the cavity 30 is solid as opposed to having a projecting central portion of the surface of the printing plate within the confines thereof. The cavity 30 is of a larger size than the cavity 29, all of the increase inside of the cavity 30 being outwardly due to the fact that the cavity 29 is also continuous and there being no room for inward expansion of the cavity 30 as compared with the cavity 29.

Reference is now made to FIGURE 11 wherein the cells 16, 19, 21, 23, 25, 27, and the cavities 29 and 30 are disposed in adjacent aligned relation and the changes in sizes of the cells and the cavities may be readily determined, and the various cells and cavities compared.

Figure 2:
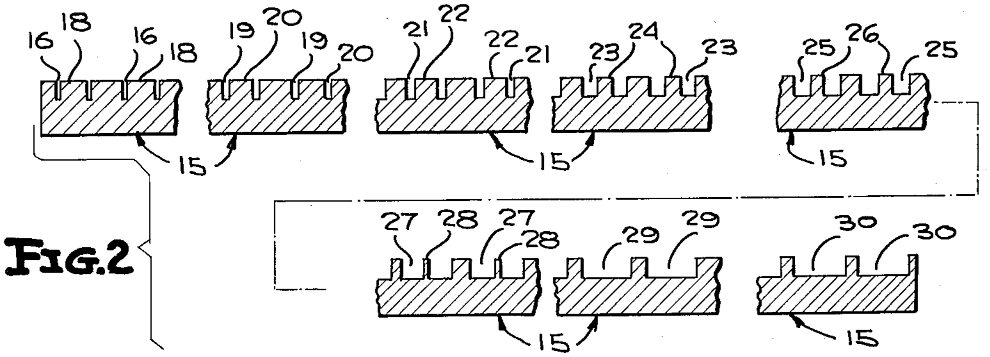
FIGURE 2 is a vertical sectional view on an enlarged scale taken through the schematic showing of the printing plate of FIGURE 1, and shows the specific cross-section of the printing plate in each of the tone areas, intermediate portions of the printing plate being omitted.

Referring now to FIGURE 2 in particular, it will be seen that all of the cells and cavities of the printing plate 15 are substantially of the same depth. In actual practice, the smaller cells may be of a slightly less depth than the larger cells or cavities due to etching problems. Thus, the volume of ink available to be delivered to a printing surface by each of the numerous cells and cavities of a printing surface formed in accordance with this invention is primarily dependent upon the cross-section of the cells and cavities. It will thus be apparent that the cells 16 will provide the least available amount of ink for delivery to a printing surface, whereas the cavities 30 will provide a maximum volume of ink available for delivery to a printing surface.

Due to the fact that all the cells and cavities of the printing surface of the printing plate 15 are substantially of the same depth, it will be readily apparent that a printing plate or surface formed in accordance with this invention is not subject to the problem of wear as is in the case of other types of gravure printing plates. It will also be apparent that even the smallest capacity cells, the cells 16, have a relatively large peripheral outline to thus permit the printing on relatively rough paper having pockets or other surface deficiencies which prevents the printing thereon with other types of suitable gravure printing surfaces.

Although the individual cells and cavities have been illustrated as being square or rectangular in outline, it is to be understood that other configurations are operable. For example, if desired, the channels of the cells, as well as the cavities 29 and 30, may be circular in outline.

From the foregoing, it will be seen that novel and advantageous provision has been made for carrying out the desired end. However, attention is directed to the fact that variations may be made in the example cell construction disclosed herein without departing from the spirit and scope of the invention, as defined in the appended claims.

I claim:

1. A screened gravure printing body including an upper surface having formed therein ink receiving cells positioned in accordance with the area to be printed and of ink capacity in accordance with the desired tone depth, said cells being arranged in a rectilinear pattern and all of said cells being substantially of the same depth, and said cells being in the form of continuous channels surrounding central portions of said upper surface with the widths of said channels varying in accordance with a desired tone depth less than full tone depth.

2. A screened gravure printing body including an upper surface having formed therein ink receiving cells positioned in accordance with the area to be printed and of ink capacity in accordance with the desired tone depth, said cells being arranged in a rectilinear pattern and all of said cells being substantially of the same depth, and said cells being in the form of continuous channels surrounding central portions of said upper surface with the widths of said channels varying in accordance with a desired tone depth, said channels increasing in width inwardly with respect to each cells center with an increase in tone depth less than full tone depth.

3. A screened printing body including an upper surface having formed therein ink receiving cells positioned in accordance with the area to be printed and of ink capacity in accordance with the desired tone depth, said cells being arranged in a rectilinear pattern and all of said cells being substantially of the same depth, and said cells being in the form of continuous channels surrounding central portions of said upper surface with the widths of said channels varying in accordance with a desired tone depth less than full tone depth, said channels increasing in width inwardly with respect to each cells center with an increase in tone depth, and said channels transforming into single cavities devoid of said central portions in accordance with a desired full tone depth.

4. A screened gravure printing body including an upper surface having formed therein ink receiving cells positioned in accordance with the area to be printed and of ink capacity in accordance with the desired tone depth, said cells being arranged in a rectilinear pattern and all of said cells being substantially of the same depth, and said cells being in the form of continuous channels surrounding central portions of said upper surface with the widths of said channels varying in accordance with a desired tone depth, said channels increasing in width outwardly with respect to each cells center with an increase in tone depth less than full tone depth.

5. A screened gravure printing body including an upper surface having formed therein ink receiving cells positioned in accordance with the area to be printed and of ink capacity in accordance with the desired tone depth, said cells being arranged in a rectilinear pattern and all of said cells being substantially of the same depth, and said cells being in the form of continuous channels surrounding central portions of said upper surface with the widths of said channels varying in accordance with a desired tone depth, said channels increasing in width both inwardly and outwardly with respect to each cells center with an increase in tone depth less than full tone depth.

6. A screened gravure printing body including an upper surface having formed therein ink receiving cells positioned in accordance with the area to be printed and of ink capacity in accordance with the desired tone depth, said cells being arranged in a rectilinear pattern and all of said cells being substantially of the same depth, and said cells being in the form of continuous channels surrounding central portions of said upper surface with the widths of said channels varying in accordance with a desired tone depth, said channels increasing in width both inwardly and outwardly with respect to each cells center with an increase in tone depth less than full tone depth, and said channels transforming into single cavities devoid of said central portions in accordance with a desired full tone depth.

7. The screened gravure printing surface of claim 1 wherein said channels are square in outline.

8. A screened gravure printing body including an upper surface having formed therein ink receiving cells positioned in accordance with the area to be printed and of ink capacity in accordance with the desired tone depth, said cells being arranged in a rectilinear pattern and said cells being in the form of continuous channels surrounding central portions of said upper surface with the widths of said channels varying in accordance with a desired tone depth, said channels increasing in width both inwardly and outwardly with respect to each cells center with an increase in tone depth less than full tone depth, and said channels transforming into single cavities devoid of said central portions in accordance with a desired full tone depth.

References Cited in the file of this patent

UNITED STATES PATENTS

| | | |
|---|---|---|
| 1,038,266 | Bartlett | Sept. 10, 1912 |
| 1,322,206 | Simon | Nov. 18, 1919 |
| 1,741,471 | Mavor et al. | Dec. 31, 1929 |
| 2,170,560 | Hayes | Aug. 22, 1939 |